(12) United States Patent
Numata

(10) Patent No.: US 10,442,464 B2
(45) Date of Patent: Oct. 15, 2019

(54) PARKING ASSISTANCE APPARATUS, ON-VEHICLE CAMERA, VEHICLE, AND PARKING ASSISTANCE METHOD

(71) Applicant: KYOCERA Corporation, Kyoto (JP)

(72) Inventor: Yusuke Numata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/082,944

(22) PCT Filed: Mar. 8, 2017

(86) PCT No.: PCT/JP2017/009328
§ 371 (c)(1),
(2) Date: Sep. 7, 2018

(87) PCT Pub. No.: WO2017/159510
PCT Pub. Date: Sep. 21, 2017

(65) Prior Publication Data
US 2019/0084618 A1   Mar. 21, 2019

(30) Foreign Application Priority Data

Mar. 18, 2016 (JP) ................. 2016-055928

(51) Int. Cl.
*B62D 15/02* (2006.01)
*B60R 21/00* (2006.01)
*G06T 7/70* (2017.01)
*B60R 1/00* (2006.01)
*G01S 15/93* (2006.01)
*G08G 1/16* (2006.01)

(52) U.S. Cl.
CPC .............. *B62D 15/028* (2013.01); *B60R 1/00* (2013.01); *B60R 21/00* (2013.01); *G01S 15/931* (2013.01); *G06T 7/70* (2017.01); *G08G 1/168* (2013.01); *B60R 2300/806* (2013.01); *G01S 2015/935* (2013.01); *G06T 2207/30264* (2013.01)

(58) Field of Classification Search
CPC ........... B62D 15/028; G06T 7/70; B60R 1/00; G01S 15/931; G08G 1/168
See application file for complete search history.

(56) References Cited

U.S. PATENT DOCUMENTS

| 7,117,073 B2 | 10/2006 | Endo et al. |
| 2005/0043871 A1* | 2/2005 | Endo .................. B62D 15/0275 701/36 |
| 2011/0057813 A1* | 3/2011 | Toledo ...................... B60T 7/22 340/932.2 |

FOREIGN PATENT DOCUMENTS

| JP | H11-208420 A | 8/1999 |
| JP | 2005-041373 A | 2/2005 |
| JP | 2011-230549 A | 11/2011 |

* cited by examiner

*Primary Examiner* — Curtis B Odom
(74) *Attorney, Agent, or Firm* — Studebaker & Brackett PC

(57) ABSTRACT

A parking assistance apparatus includes a processor and a memory. The processor extracts a parking space from a surrounding image of a vehicle and generates an image in which a target parking position is in overlap with the parking space, the surrounding image being captured by an imaging apparatus provided in the vehicle. The memory stores history information associating a parking position of the vehicle with the parking space. The processor adjusts a position of the target parking position in the image on the basis of the history information.

13 Claims, 6 Drawing Sheets

PARKING ASSISTANCE APPARATUS, ON-VEHICLE CAMERA, VEHICLE, AND PARKING ASSISTANCE METHOD

CROSS-REFERENCE TO RELATED APPLICATION

The present application claims priority to and the benefit of Japanese Patent Application No. 2016-055928 filed Mar. 18, 2016, the entire contents of which are incorporated herein by reference.

TECHNICAL FIELD

The present disclosure relates to a parking assistance apparatus, an on-vehicle camera, a vehicle, and a parking assistance method.

BACKGROUND

Apparatuses for assisting with vehicle driving are known.

SUMMARY

A parking assistance apparatus according to an embodiment of the present disclosure includes a processor that extracts a parking space from a surrounding image of a vehicle and generates an image having a target parking position in overlap with the parking space, the surrounding image being captured by an imaging apparatus provided in the vehicle. The parking assistance apparatus includes a memory that stores history information associating a parking position of the vehicle with the parking space. The processor adjusts the position of the target parking position in the image on the basis of the history information.

An on-vehicle camera according to an embodiment of the present disclosure includes a parking assistance apparatus. The parking assistance apparatus includes a processor that extracts a parking space from a surrounding image of a vehicle and generates an image having a target parking position in overlap with the parking space, the surrounding image being captured by an imaging apparatus provided in the vehicle. The parking assistance apparatus includes a memory that stores history information associating a parking position of the vehicle with the parking space. The processor adjusts the position of the target parking position in the image on the basis of the history information.

A vehicle according to an embodiment of the present disclosure includes a parking assistance apparatus. The parking assistance apparatus includes a processor that extracts a parking space from a surrounding image of the vehicle and generates an image having a target parking position in overlap with the parking space, the surrounding image being captured by an imaging apparatus provided in the vehicle. The parking assistance apparatus includes a memory that stores history information associating a parking position of the vehicle with the parking space. The processor adjusts the position of the target parking position in the image on the basis of the history information.

A parking assistance method according to an embodiment of the present disclosure is executed by a parking assistance apparatus including a processor and a memory. The parking assistance method includes extracting, using the processor, a parking space from a surrounding image of a vehicle, the surrounding image being captured by an imaging apparatus provided in the vehicle. The parking assistance method includes generating, using the processor, an image having a target parking position in overlap with the parking space. The parking assistance method includes storing, using the memory, history information associating a parking position of the vehicle with the parking space. The parking assistance method includes adjusting, using the processor, the position of the target parking position in the image on the basis of the history information.

DETAILED DESCRIPTION

Embodiments of the present disclosure are described below with reference to the drawings.

(Schematic Configuration of Parking Assistance Apparatus and On-Vehicle Camera System)

A parking assistance apparatus 1 and an on-vehicle camera system 10 according to embodiments of the present disclosure are described.

Figure 1:
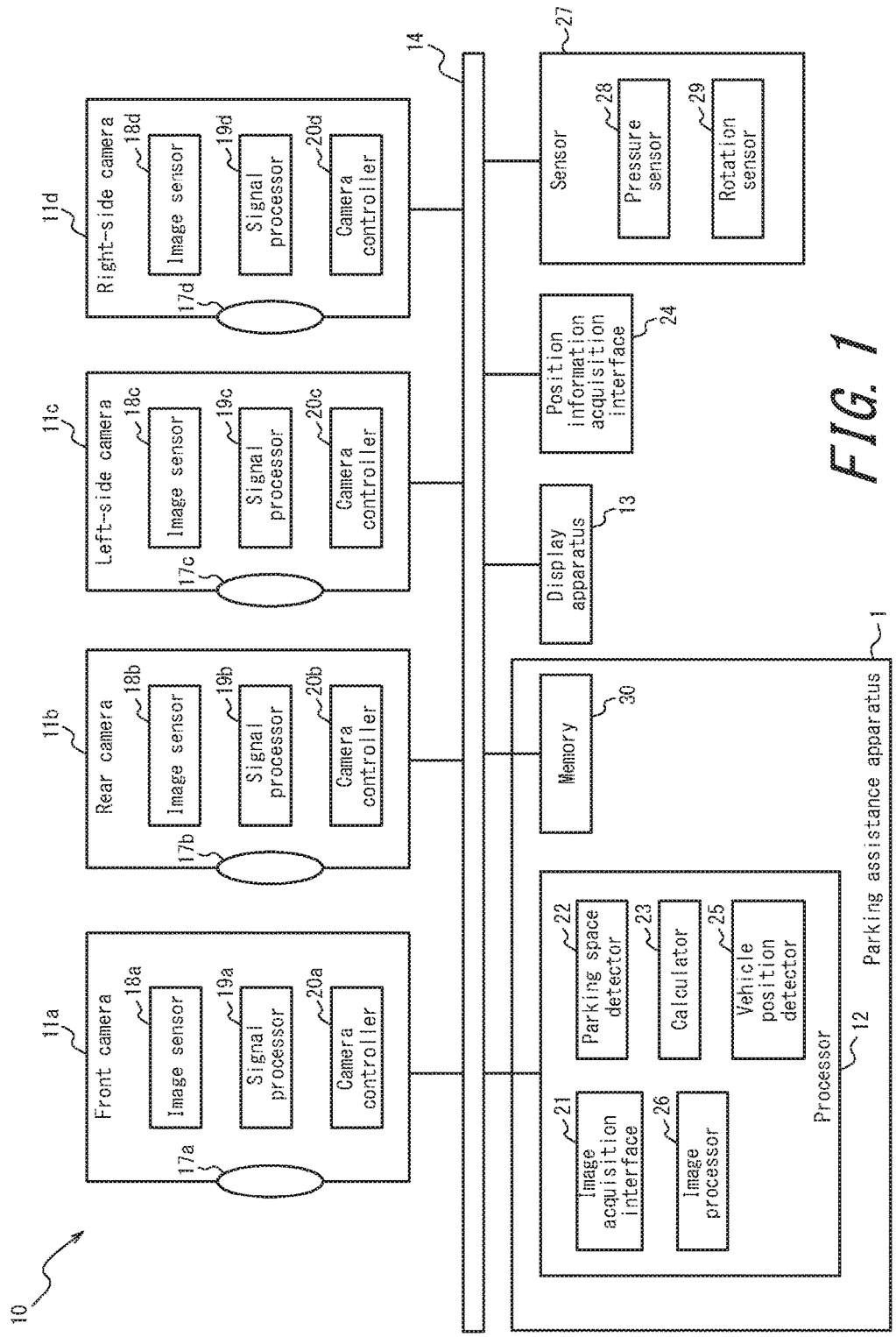
FIG. 1 is a block diagram illustrating the schematic configuration of a parking assistance apparatus and an on-vehicle camera system including the parking assistance apparatus according to embodiments of the present disclosure.

As illustrated in FIG. 1, the on-vehicle camera system 10 includes a plurality of imaging apparatuses, the parking assistance apparatus 1, a display apparatus 13, a position information acquisition interface 24, and a sensor 27. The plurality of imaging apparatuses include a front camera 11*a*, a rear camera 11*b*, a left-side camera 11*c*, and a right-side camera 11*d*. The parking assistance apparatus 1 includes a processor 12 and a memory 30. In the present embodiment, the constituent elements of the on-vehicle camera system 10 and the constituent elements of the parking assistance apparatus 1 can transmit and receive information through a dedicated line or an on-vehicle network 14, such as a controller area network (CAN). The memory 30 is included in the parking assistance apparatus 1, but constituent elements other than the processor 12 (such as the front camera 11*a*) can also access the memory 30.

Figure 2:
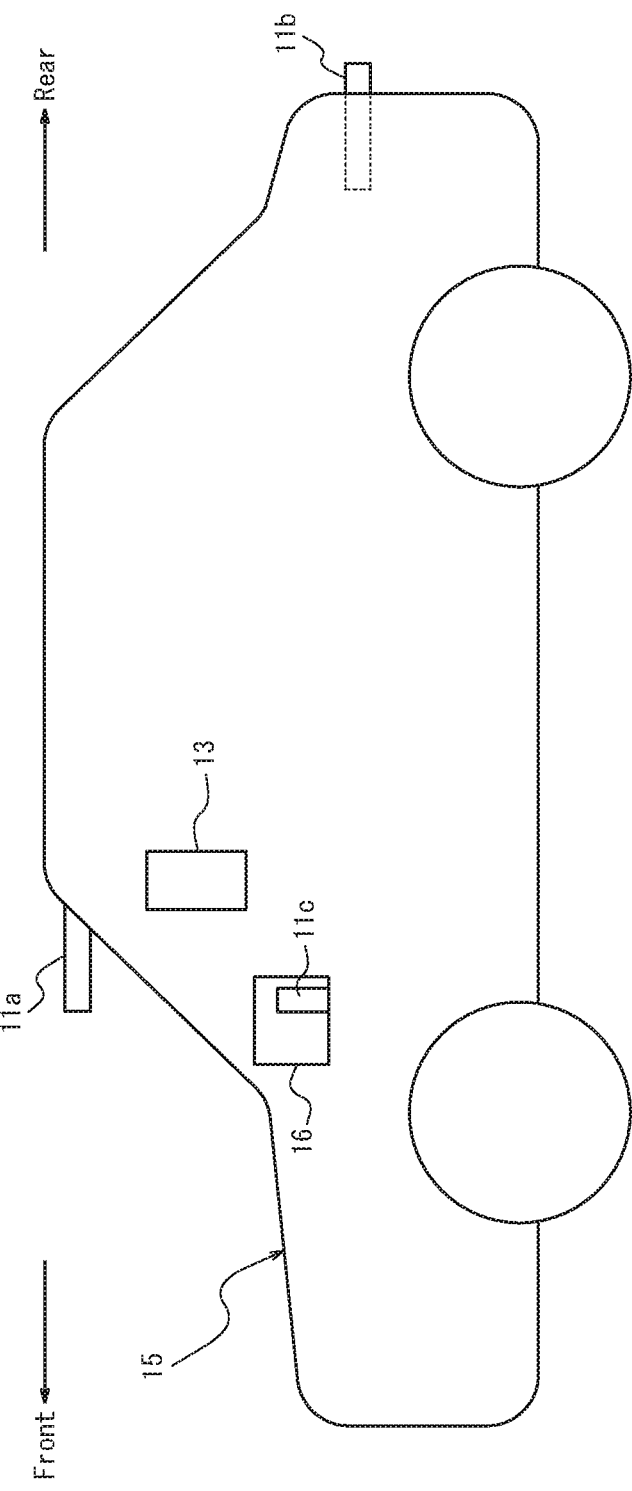
FIG. 2 schematically illustrates the arrangement of constituent elements of the on-vehicle camera system of FIG. 1.

As illustrated in FIG. 2, the front camera 11*a* is arranged to allow capturing of an image of the surrounding area in front of the vehicle 15. The rear camera 11*b* is arranged to allow capturing of an image of the surrounding area behind the vehicle 15. The left-side camera 11*c* and the right-side camera 11*d* are, for example, arranged facing perpendicularly downward in the left and right side-view mirrors 16 to allow capturing of images of the surrounding area on the sides of the vehicle 15. The right-side camera 11*d* is not depicted in FIG. 2 due to being hidden by the body of the vehicle 15. The left-side camera 11c and the right-side camera 11d are positioned symmetrically on the left and right sides of the vehicle 15. The display apparatus 13 is arranged at a position visible from the driver's seat.

The front camera 11a, rear camera 11b, left-side camera 11c, and right-side camera 11d are each provided with a lens having a wide field of view, such as a fisheye lens, and are capable of wide-angle shooting of the surrounding area of the vehicle 15. In general, images of subjects over a wide range can be captured by wide-angle shooting, and subjects in the image periphery are curved. The image is displayed on the display apparatus 13, however, after curving is corrected by the imaging apparatus itself or by the parking assistance apparatus 1.

Next, referring back to FIG. 1, the structure of the front camera 11a, rear camera 11b, left-side camera 11c, and right-side camera 11d is described. The front camera 11a includes an optical system 17a, an image sensor 18a, a signal processor 19a, and a camera controller 20a.

The optical system 17a is configured to include an aperture and a lens and forms an image of a subject. In the present embodiment, the optical system 17a has a wide field of view and can capture an image of a subject included in the surrounding area of the vehicle 15, as described above.

The image sensor 18a is, for example, a complementary metal oxide semiconductor (CMOS) image sensor and captures an image of a subject formed by the optical system 17a. The image sensor 18a also outputs the captured image generated by imaging to the signal processor 19a as an image signal.

The signal processor 19a executes luminance signal processing (such as brightness correction and gamma correction) and color signal processing (such as color interpolation, color correction, and white balance) on the image signal acquired from the image sensor 18a. The signal processor 19a may also remove noise. The signal processor 19a outputs image data after this image processing to the parking assistance apparatus 1.

The camera controller 20a controls operations of each portion of the front camera 11a. For example, the camera controller 20a controls operations of the image sensor 18a and the signal processor 19a to output an image signal periodically, for example at 30 fps.

The rear camera 11b, left-side camera 11c, and right-side camera 11d include respective optical systems 17b, 17c, and 17d, like the front camera 11a. The rear camera 11b, left-side camera 11c, and right-side camera 11d include respective image sensors 18b, 18c, and 18d. The rear camera 11b, left-side camera 11c, and right-side camera 11d include respective signal processors 19b, 19c, and 19d. The rear camera 11b, left-side camera 11c, and right-side camera 11d include respective camera controllers 20b, 20c, and 20d. The functions and configuration of the optical systems 17b, 17c, and 17d, the image sensors 18b, 18c, and 18d, the signal processors 19b, 19c, and 19d, and the camera controllers 20b, 20c, and 20d are as in the front camera 11a. A portion of the imaging apparatuses may be omitted from the on-vehicle camera system 10. For example, the on-vehicle camera system 10 may be configured without the front camera 11a.

The processor 12 of the parking assistance apparatus 1 includes an image acquisition interface 21, a parking space detector 22, a calculator 23, a vehicle position detector 25, and an image processor 26. The processor 12 in the present embodiment is a central processing unit (CPU) that implements particular functions by reading particular programs. The processor 12 may be configured by a single CPU or by a plurality of CPUs.

The memory 30 of the parking assistance apparatus 1 stores a variety of data used in calculation and processing executed by the processor 12. The memory 30 also stores programs for the processor 12 to function as the image acquisition interface 21, parking space detector 22, calculator 23, vehicle position detector 25, and image processor 26. The memory 30 stores a plurality of pieces of the below-described history information.

Through the on-vehicle network 14, the image acquisition interface 21 acquires image data of the surrounding areas in the directions of the front camera 11a, rear camera 11b, left-side camera 11c, and right-side camera 11d. The image acquisition interface 21 may acquire all of the image data of the surrounding areas at the front, back, and sides (right side, left side) or acquire only a portion of the image data. For example, after acquiring all of the image data and storing the image data temporarily in the memory 30, the image acquisition interface 21 may extract (designate) only the necessary area. The image acquisition interface 21 also stores, in the memory 30, an image of the vehicle 15 before stopping in the parking space. This image is usable in calculation of the below-described deviation rate. All or a portion of the images, acquired by the image acquisition interface 21, of the surrounding areas at the front, back, and sides corresponds to the surrounding image of the present disclosure.

The parking space detector 22 detects a parking space (an area in which the vehicle 15 can park). When, for example, the vehicle 15 is parked in an urban parking space, the parking space detector 22 can detect the parking space by detecting white lines. When, for example, the vehicle 15 is parked in a home garage, the parking space detector 22 can detect the parking space by detecting the side and back walls. The parking space is an area in which the vehicle 15 can be parked. A target parking position is set within the parking space. Information on the parking space detected by the parking space detector 22 is stored in the memory 30 and is used when, for example, the image processor 26 generates an image in which the parking space and the target parking position are in overlap.

The calculator 23 calculates the deviation rate and stores the result, including past deviation rates, in the memory 30 as history information. The deviation rate is a value indicating the extent to which the actual parking position of the vehicle 15 deviates from the center of the parking space. In the present embodiment, the calculator 23 calculates the deviation rate in the left/right direction of the vehicle 15.

The calculator 23 executes statistical calculation processing on the deviation rate. The driver's preferences and habits regarding the parking position can be learned by performing a statistical calculation on the past and current deviation rates. The statistical calculation may, for example, be calculation of the mean or, as in the present embodiment, calculation of the mode. The mean and the mode may also be switched between in accordance with the number of parameters. The calculator 23 may also reflect recent trends by selecting a predetermined number (such as 10) of the most recent deviation rates as parameters. The calculator 23 stores the history information in the memory 30 and outputs the result of the statistical processing to the image processor 26.

The image processor 26 generates an image in which the target parking position is in overlap with the image that is acquired by the image acquisition interface 21 from the rear camera 11b and that includes a parking space, for example.

The image processor 26 causes the display apparatus 13 to display the generated image. The image processor 26 also causes the below-described parking guide lines to be displayed in overlap. The image processor 26 may additionally execute processing to highlight the parking space. When the absolute value of the difference between the mode of the deviation rate acquired from the calculator 23 and the currently set value exceeds a threshold, the image processor 26 generates an image after adjusting the display position of the target parking position and causes the display apparatus 13 to display the image. The image processor 26 acquires seating-related information (information on the passengers of the vehicle 15) and adjusts the position of the target parking position in the generated image. For example, when many people are seated on the passenger's side, the target parking position may be displayed by shifting the parking position towards the driver's side for the passengers to get in and out more easily.

The vehicle position detector 25 acquires position information of the vehicle 15 and outputs the position information to the calculator 23. In the present embodiment, the vehicle position detector 25 learns the position of the vehicle 15 by acquiring position data detected with a global positioning system (GPS) from the position information acquisition interface 24. The position information allows the calculator 23 to select appropriate history information from among the plurality of pieces of history information stored in the memory 30. Here, the parking assistance apparatus 1 can appropriately reflect driver preferences that differ by parking location by using a plurality of pieces of history information for different parking locations. For example, when the driver prefers to park towards the right in a home garage and to park in the center in an urban parking space, the parking assistance apparatus 1 can display target parking positions suitable for the various locations.

The display apparatus 13 includes, for example, a liquid crystal display (LCD) and can display moving images in real time. Through the on-vehicle network 14, the display apparatus 13 displays an image with at least the target parking position in overlap.

The position information acquisition interface 24 is an apparatus for acquiring GPS position information from a source external to the vehicle 15. For example, the position information acquisition interface 24 may be a GPS antenna or a GPS receiver. A portion of a car navigation system installed in the vehicle 15 may also be used as the position information acquisition interface 24.

The sensor 27 includes a pressure sensor 28 that detects pressure on the seat and backrest, a rotation sensor located in the seatbelt retractor and capable of detecting the pulled-out state of the belt, and the like. The sensor 27 outputs seating-related information to the processor 12 through the on-vehicle network 14.

(Adjustment of Target Parking Position)

An example image, displayed on the display apparatus 13, in which the target parking position and parking guide lines are overlaid on a captured image is described below. The processing by the parking assistance apparatus 1 (parking assistance method) is then described. An example in which the vehicle 15 equipped with the on-vehicle camera system 10 including the parking assistance apparatus 1 backs into a predetermined parking space PS, as in FIG. 3, is used as appropriate in the following explanation.

Figure 3:
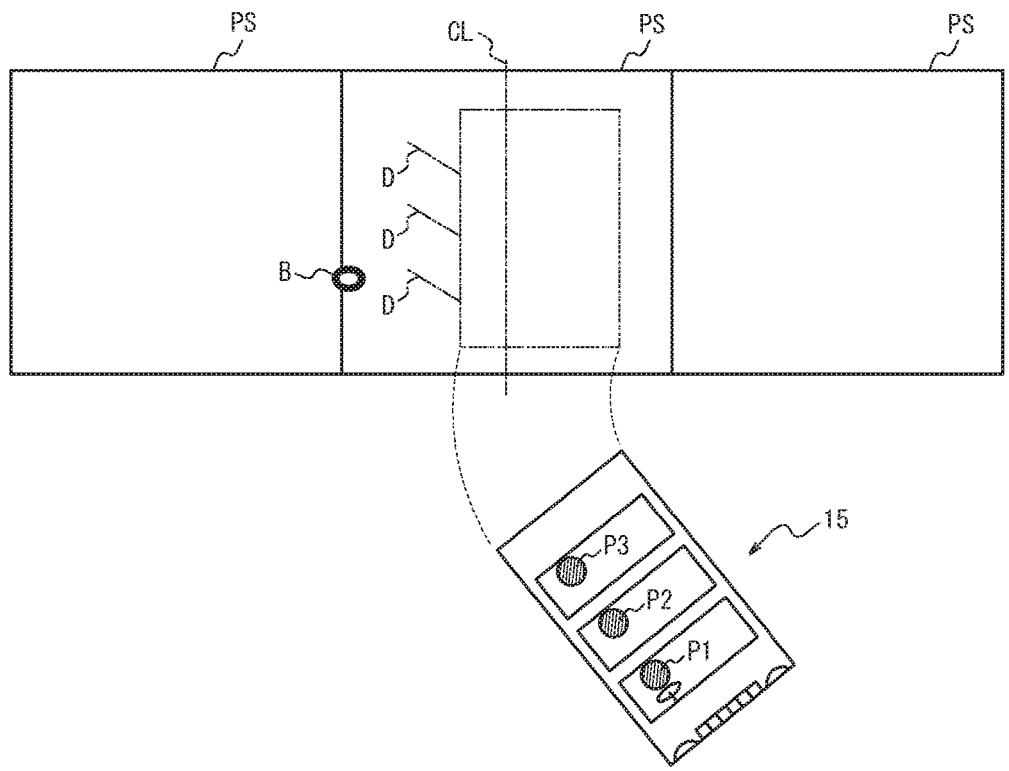
FIG. 3 illustrates an example of parking of a vehicle equipped with the on-vehicle camera system of FIG. 1.

In the example in FIG. 3, the vehicle 15 parks in the center space among three parking spaces PS. The centerline CL is a virtual line separating the parking space PS into equal-width left and right halves. An obstacle B is present at the boundary with the parking space PS located to the left on paper.

At this time, the passengers P1, P2, and P3 of the vehicle 15 are all seated on the driver's side (to the left on paper) and get out from the adjacent doors D (to the left on paper). It is thought that the driver (passenger P1 in the example in FIG. 3) will park far away from the obstacle B so that the obstacle B does not prevent the doors D from opening sufficiently. It is also thought that when the driver frequently uses the parking space PS with the obstacle B, the driver will tend to park away from the obstacle B even when the other passengers P2, P3 are not on board. In other words, it is thought that the driver will tend to park so that the center of the vehicle 15 is to the right, on paper, of the centerline CL of the parking space PS.

In a known apparatus for parking assistance, the displayed target parking position is either always the same or requires manual operation by the driver for adjustment. As explained below, the parking assistance apparatus 1 according to the present embodiment can display a driving assistance guide that reflects preferences and habits regarding the parking position without requiring a troublesome operation by the driver.

Figure 4:
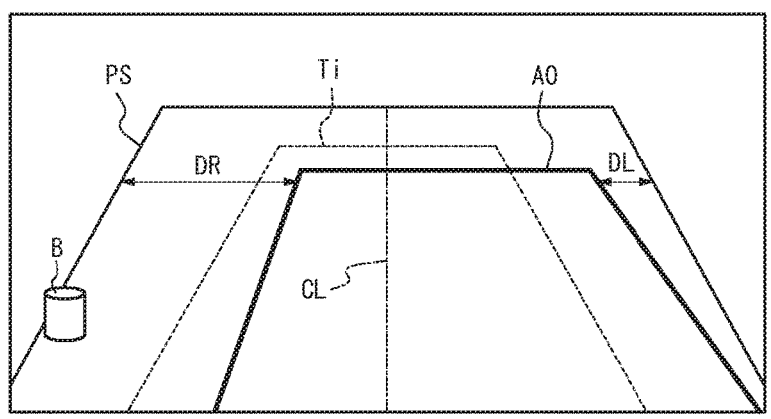
FIG. 4 illustrates a parking space and a target parking position.

First, an image in the initial state (image before reflecting the driver's preferences and habits) displayed by the parking assistance apparatus 1 according to the present embodiment is described with reference to FIG. 4. As illustrated in FIG. 4, the image in the initial state is the image captured by the rear camera 11b and includes the parking space PS and the obstacle B. The parking space PS is surrounded by white lines. The parking assistance apparatus 1 recognizes the parking space PS by a process to detect white lines. The target parking position Ti is an image indicating the parking position, of the vehicle 15, that is a target for the driver. The parking guide line A0 is an image indicating a predicted driving trajectory of the vehicle 15 and changes in accordance with the steering angle of the vehicle 15. The target parking position Ti and the parking guide line A0 are displayed in overlap on the captured image to assist with driving of the vehicle 15. The driver can park the vehicle 15 in the center of the parking space PS by maneuvering the vehicle 15 so that the parking guide line A0 overlaps the target parking position Ti. Here, the centerline CL of the parking space PS is a virtual line for the sake of explanation. The parking assistance apparatus 1 may display the centerline CL in overlap.

As illustrated in FIG. 4, the target parking position Ti displayed by the parking assistance apparatus 1 in the initial state is symmetrical with respect to the centerline CL. Here, as indicated by the parking guide line A0 in FIG. 4, the driver tends to park the vehicle 15 to the right, on paper, of the target parking position Ti to avoid the obstacle B. Therefore, the target parking position Ti displayed by the parking assistance apparatus 1 in the initial state does not reflect the driver's preferences and habits regarding the parking position. The parking assistance apparatus 1 stores, in the memory 30, the image that includes the parking space PS and the parking guide line A0 when the vehicle 15 is parked. The calculator 23 then acquires the image from the memory 30, calculates a right distance DR and a left distance DL, illustrated in FIG. 4, of the vehicle 15 and sets the ratio of these distances as a deviation rate R. The deviation rate R is expressed by Equation (1) below.

$$R = DR/DL \qquad \text{Equation(1)}$$

Here, the right distance DR is the distance from the vehicle 15 to the right (the left on paper) boundary of the parking space PS with reference to the forward direction of the vehicle 15. The left distance DL is the distance from the vehicle 15 to the left (the right on paper) boundary of the parking space PS with reference to the forward direction of the vehicle 15. The deviation rate R is greater than one when the vehicle 15 is parked to the left (the right on paper) with reference to the forward direction of the vehicle 15. Conversely, the deviation rate R is less than one when the vehicle 15 is parked to the right (the left on paper) with reference to the forward direction of the vehicle 15. The parking assistance apparatus 1 not only acquires the right distance DR and the left distance DL but also judges the deviation of the parking position on the basis of the deviation rate R, which is the ratio of these distances. Therefore, the deviation of the parking position is judged by the same standard, i.e. the deviation rate R, regardless of the size of the parking space PS. Here, the image that the calculator 23 acquires from the memory 30 to calculate the deviation rate R is, in the present embodiment, an image in which the vehicle 15 is about to stop and the steering angle is not changed. The image is not limited, however, as long as the right distance DR and the left distance DL can be acquired. Furthermore, the positions for measuring the right distance DR and the left distance DL are set along the parking guide line A0 near the back end of the vehicle 15 in the present embodiment, but the positions are not limited.

Figure 5:
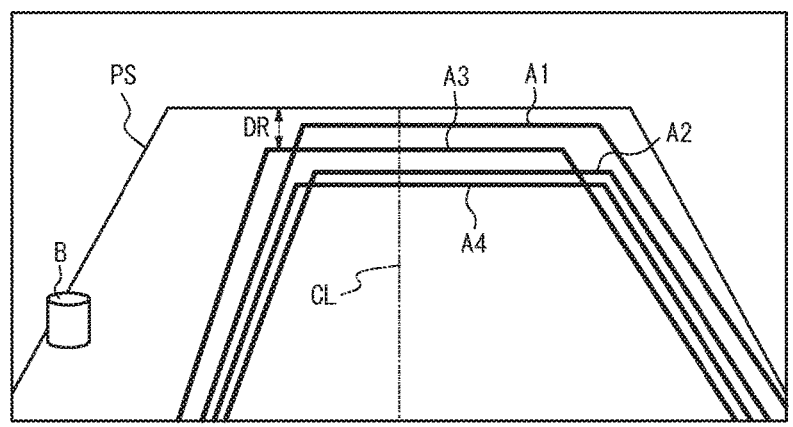
FIG. 5 illustrates a vehicle parking position and history information.

The parking space PS in FIG. 5 is the same as in FIG. 4, but a plurality of parking guide lines A1 to A4 for the vehicle 15 are displayed in overlap in FIG. 5. In other words, FIG. 5 displays parking guide lines A1 to A4 indicating the parking positions after the vehicle 15 was parked multiple times. As illustrated in FIG. 5, the driver in the example of the present embodiment tends to park so that the center of the vehicle is to the right, on paper, of the centerline CL of the parking space PS.

The calculator 23 calculates the deviation rate R for each of a plurality of instances of parking of the vehicle 15. For example, the deviation rates R are calculated as "1.2", "1.3", "1.1", and "1.2". The parking position of the vehicle 15 is associated with the parking space PS by the deviation rates R. The calculator 23 stores the calculated deviation rates in the memory 30 as history information. In other words, the history information is a list of deviation rates R that are information on past parking positions. At this time, the individual deviation rates R may be stored in table format in association with time information. Here, a plurality of pieces of history information divided into predetermined categories (i.e. divided by conditions) are used. In the present embodiment, the predetermined categories are the position information of the vehicle 15, and history information is prepared for each parking location. Hence, the parking assistance apparatus 1 can reflect the driver's preferences and habits for each parking location. The calculator 23 acquires the position information of the vehicle 15 from the vehicle position detector 25 and selects the history information for the parking space PS from among the plurality of pieces of history information.

Figure 6:
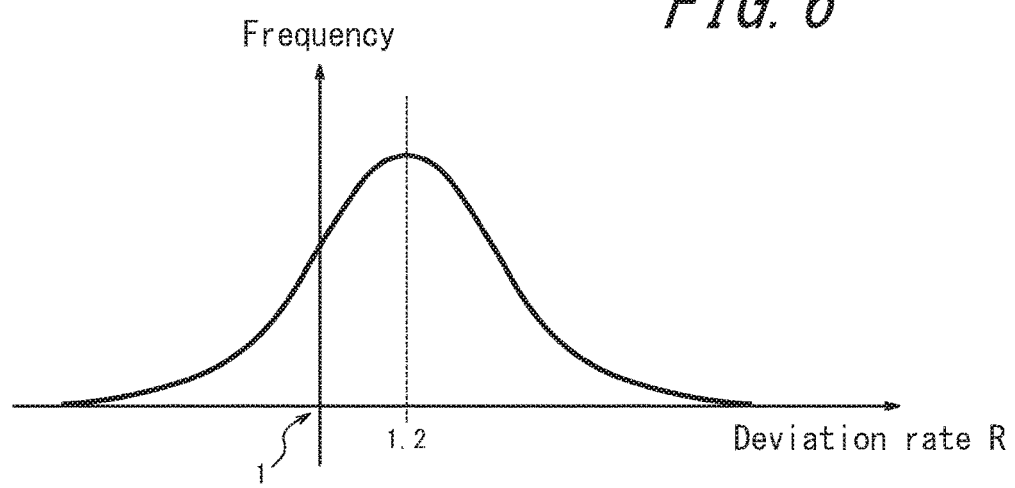
FIG. 6 illustrates statistical processing of the history information.

The calculator 23 performs statistical calculation processing on the deviation rates R for multiple instances of parking of the vehicle 15 to learn the driver's preferences and habits regarding the parking position. In the present embodiment, the calculator 23 calculates the mode of the deviation rate R. FIG. 6 illustrates an example of the result of the statistical processing executed by the calculator 23 on the history information. The deviation rate R is one when the center of the vehicle 15 is on the centerline CL. In the example in FIG. 6, however, the mode of the deviation rate R is 1.2. In other words, the driver tends to park to the left (the right on paper) with reference to the forward direction of the vehicle 15. Statistical processing of the history information thus makes clear the driver's preferences and habits regarding the parking position. The result of the statistical processing by the calculator 23 is output to the image processor 26.

Figure 7:
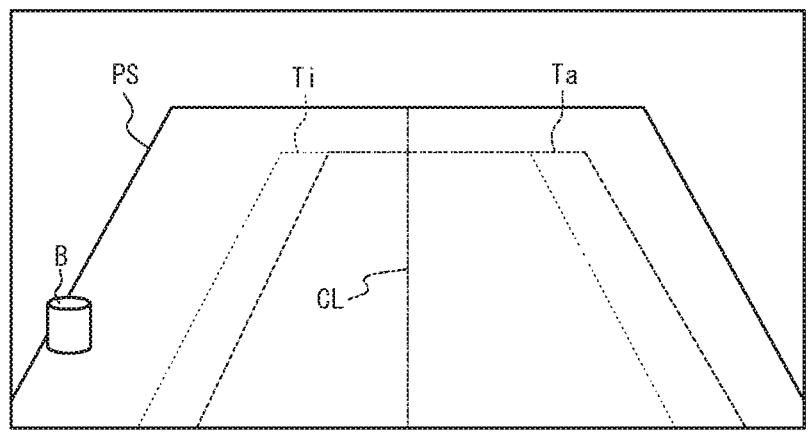
FIG. 7 illustrates an example of an adjusted target parking position.

When the absolute value of the difference between the mode of the deviation rate R acquired from the calculator 23 and the currently set value exceeds a threshold, the image processor 26 generates an image after adjusting the display position of the target parking position Ti and causes the display apparatus 13 to display the image. In the present embodiment, the mode of the deviation rate R acquired from the calculator 23 is 1.2. The currently set value is the deviation rate R of the center of the current target parking position Ti, i.e. one. The threshold is assumed to be set to 0.1. At this time, the image processor 26 adjusts the display position of the target parking position Ti, since the absolute value (0.2) of the difference between the mode of the deviation rate R acquired from the calculator 23 and the currently set value exceeds the threshold (0.1). FIG. 7 illustrates the adjusted target parking position Ta, which is shifted to the right, on paper, from the target parking position Ti in accordance with the driver's preferences and habits regarding the parking position. Specifically, the image processor 26 adjusts the target parking position Ta so that the deviation rate R of the center thereof becomes 1.2. After this adjustment, the image processor 26 performs parking assistance by displaying the target parking position Ta instead of the target parking position Ti. The driver can therefore park the vehicle 15 at the preferred position by maneuvering the vehicle 15 so that the parking guide lines overlap the target parking position Ta.

Here, the image processor 26 may receive the seating-related information from the sensor 27. The image processor 26 can further adjust the target parking position Ta to be convenient for the passengers P1, P2, P3 on the basis of this information.

For example, the image processor 26 may learn that the "seating position" of the passengers P1, P2, P3 is on the driver's side (see FIG. 3). To ensure enough space for getting in and out, the image processor 26 may further shift the target parking position Ta to the right on paper. Specifically, the image processor 26 may adjust the target parking position Ta so that the deviation rate R of the center thereof becomes 1.25. At this time, the driver can maneuver the vehicle 15 so that the parking guide lines overlap the target parking position Ta, thereby parking the vehicle 15 at an appropriate position that also accounts for the passengers P1, P2, P3 getting in and out.

(Parking Assistance Method)

Figure 8:
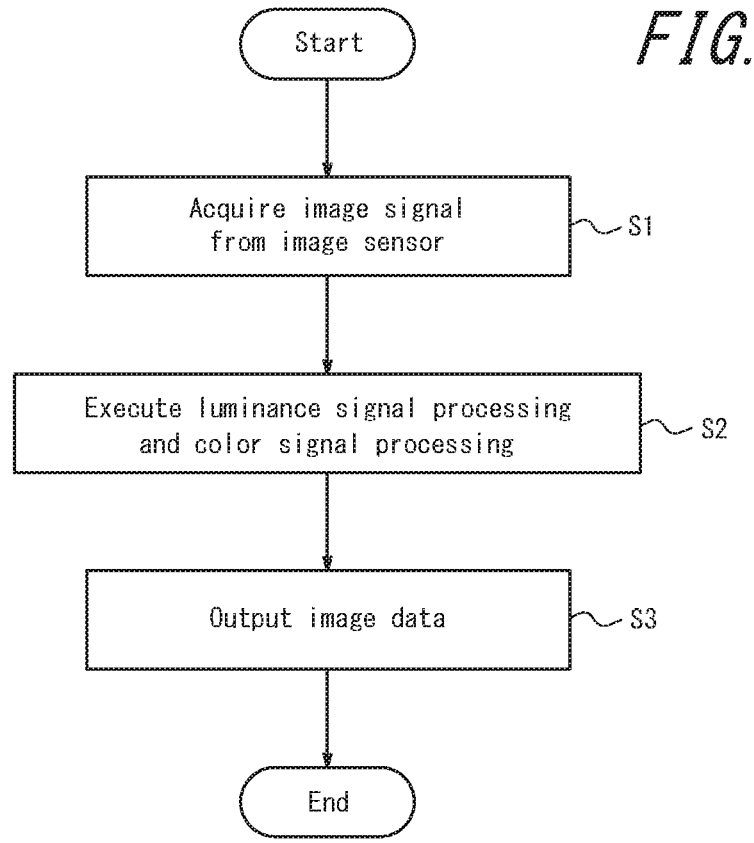
FIG. 8 is a flowchart illustrating processing by an imaging apparatus.
Figure 9:
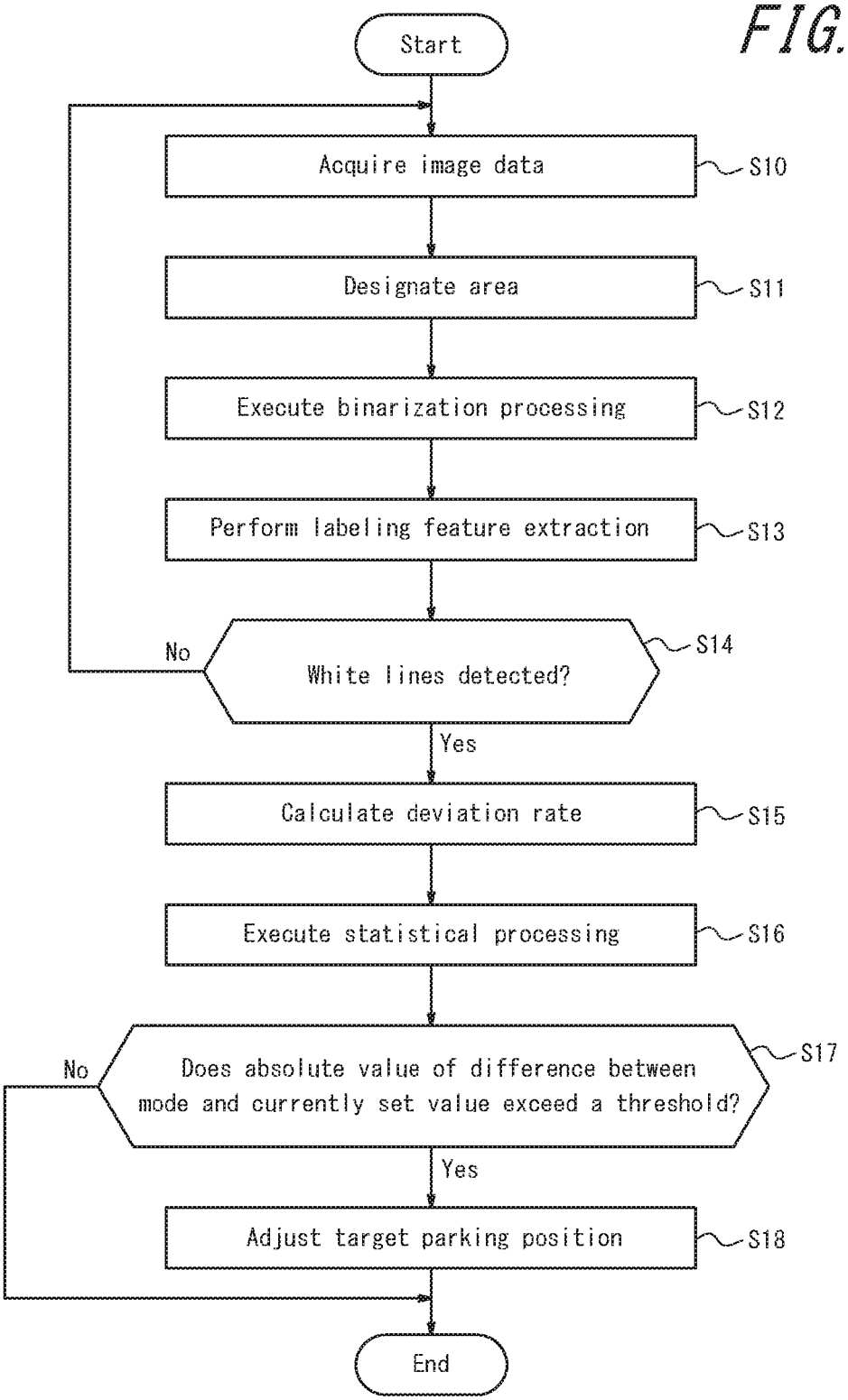
FIG. 9 is a flowchart illustrating a parking assistance method.

With reference to FIG. 8 and FIG. 9, the processing executed in the above embodiment is now described. First, the processing executed by the signal processors 19a, 19b, 19c, and 19d of the imaging apparatuses (front camera 11a, rear camera 11b, left-side camera 11c, and right-side camera 11d) included in the vehicle 15 is described with reference to the flowchart in FIG. 8. The parking assistance method executed by the parking assistance apparatus 1 is then described with reference to the flowchart in FIG. 9.

As illustrated in FIG. 8, the signal processors 19a, 19b, 19c, and 19d acquire an image signal from the respective image sensors 18a, 18b, 18c, 18d (step S1).

The signal processors 19a, 19b, 19c, and 19d execute luminance signal processing (such as brightness correction and gamma correction) and color signal processing (such as color interpolation, color correction, and white balance) on the acquired image signal (step S2).

The signal processors 19a, 19b, 19c, and 19d output image data subjected to the aforementioned signal processing to the image acquisition interface 21 (step S3). The signal processors 19a, 19b, 19c, and 19d execute the processing in steps S1, S2, and S3 in accordance with control signals from the camera controllers 20a, 20b, 20c, and 20d.

As illustrated in FIG. 9, the image acquisition interface 21 acquires the image data (step S10). In the present embodiment, the image acquisition interface 21 acquires all of the image data of the surrounding areas at the front, back, and sides (right side, left side).

The image acquisition interface 21 designates the necessary area of image data (step S11). In the present embodiment, the image acquisition interface 21 temporarily stores all of the image data in the memory 30 and then extracts the image captured by the rear camera 11b.

The parking space detector 22 executes binarization processing (step S12). In the present embodiment, the image from the rear camera 11b is binarized (represented in two tones, white and black) to facilitate detection of white lines, since the parking space PS is surrounded by white lines.

The parking space detector 22 performs labeling feature extraction (step S13). In other words, the parking space detector 22 extracts the white regions from the binarized image and labels the regions (by assigning unique numbers, for example) to differentiate between the regions. The parking space detector 22 then selects the white regions judged to constitute white lines of the parking space PS on the basis of features such as position, length, and width.

After the parking space detector 22 detects white lines (step S14: Yes), processing proceeds to step S15. When the parking space PS cannot be identified because white lines are not detected (step S14: No), the processing returns to step S10. In other words, the image acquisition interface 21 once again acquires image data. Through the on-vehicle network 14, the parking space detector 22 may at this time cause the camera controllers 20a, 20b, 20c, and 20d to make adjustments, such as luminance signal processing.

The calculator 23 calculates the deviation rate R for the current instance of parking of the vehicle 15 (step S15). The calculator 23 then acquires the position information of the vehicle 15 from the vehicle position detector 25 and selects the history information for the target parking space PS from among the plurality of pieces of history information.

The calculator 23 acquires the deviation rates R for past instances of parking of the vehicle 15 from the history information and executes statistical processing (step S16). In the present embodiment, the calculator 23 calculates the mode of the deviation rate R. After executing the statistical processing, the calculator 23 adds the deviation rate R for the current instance of parking of the vehicle 15 to the history information for the parking space PS and stores the history information in the memory 30. In other words, the calculator 23 updates the history information. The calculator 23 then outputs the mode of the deviation rate R to the image processor 26.

When the absolute value of the difference between the mode of the deviation rate R acquired from the calculator 23 and the currently set value exceeds the threshold (step S17: Yes), the image processor 26 adjusts the target parking position (step S18) and then ends the processing sequence. In other words, the image processor 26 adjusts the target parking position when the target parking position based on the currently set value diverges to a certain degree from the parking position conforming to the driver's preferences and habits. When the absolute value of the difference between the mode of the deviation rate R acquired from the calculator 23 and the currently set value does not exceed the threshold (step S17: No), the image processor 26 ends the processing sequence without adjusting the target parking position.

When adjusting the target parking position, the image processor 26 may further adjust the display position in accordance with seating-related information from the sensor 27.

By thus adjusting the target parking position on the basis of the result of statistical processing of the history information, the parking assistance apparatus 1 according to the present embodiment can display a target parking position that reflects preferences and habits regarding the parking position without requiring a troublesome operation by the user.

Although the subject matter of the present disclosure has been described with reference to the drawings and embodiments, it is to be noted that various changes and modifications will be apparent to those skilled in the art on the basis of the present disclosure. Therefore, such changes and modifications are to be understood as included within the technical scope of the present disclosure. For example, the functions and the like included in the various means, steps, and the like may be reordered in any logically consistent way. Furthermore, means, steps, or the like may be combined into one or divided.

The parking space detector 22 performs white line detection in the above embodiment but may identify the parking space by performing edge detection instead of white line detection. For example, when the parking space is a home garage or the like, processing to detect the side walls and back wall by executing edge detection using a Sobel filter, Prewitt filter, or the like may be executed instead of steps S12, S13, and S14 of FIG. 9.

In the above embodiment, a plurality of pieces of history information are used in accordance with the position information of the vehicle 15, but a plurality of pieces of history information divided into different predetermined categories may be used. For example, the predetermined categories may be based on types of parking, such as parking side-by-side or parallel parking. The type of parking can be judged on the basis of the positional relationship between the vehicle 15 and the parking space. For example, different history information may be used when the parking space is positioned diagonally behind the vehicle 15 for parallel parking and when the parking space is positioned behind the vehicle as in the above embodiment. This allows the parking assistance apparatus 1 to further reflect the driver's preferences. Different history information can be used depending on the number of passengers (for example, one passenger or two passengers). Different history information can be used depending on the seating arrangement of passengers other than the driver (for example, front passenger seat, rear seat on driver's side, or the like). Different history information can also be used depending on the size of the parking space (for example, dividing the horizontal width into categories of 250-269 cm, 270-289 cm, 290-309 cm, and 310 cm or more). The same historical information may also be used regardless of the position information of the vehicle 15 or the like. At this time, the parking assistance apparatus 1 can reflect the driver's preferences and tendencies (such as a tendency to park to the right of the center) regardless of location.

In the above embodiment, the calculator 23 calculates the deviation rate in the left/right direction of the vehicle 15, but the calculator 23 may additionally calculate the deviation rate in the front/back direction of the vehicle 15 or may calculate only the deviation rate in the front/back direction of the vehicle 15. When calculating in the front/back direction, the calculator 23 may calculate the distance to the rear boundary of the parking space at the time of parking (DR in FIG. 5), store the distance in the memory 30 as history information, and execute statistical calculation processing. This allows the parking assistance apparatus 1 to further reflect the driver's preferences.

In the above embodiment, the processor 12 of the parking assistance apparatus 1 and the signal processors 19a, 19b, 19c, and 19d of the imaging apparatuses execute different processing, but these processors may be integrated into one processor that executes all of the processing listed in FIG. 8 and FIG. 9. For example, the signal processors 19a, 19b, 19c, and 19d may execute the processing of the processor 12 in the parking assistance apparatus 1. An imaging apparatus (on-vehicle camera) may also be configured to include the parking assistance apparatus 1.

In the above embodiment, the image processor 26 further adjusts the target parking position Ta when receiving seating-related information from the sensor 27. Here, the image processor 26 may have a function to further adjust the target parking position Ta when detecting that another vehicle is present to the left or right of the parking space. At this time, the image acquisition interface 21 extracts image data of the surrounding area on the sides (right side, left side). The parking space detector 22 then detects whether a vehicle is present to the side and outputs the detection result to the image processor 26. When a vehicle is parked to the right, for example, the image processor 26 makes an adjustment to further shift the target parking position Ta in the opposite direction (to the left). At this time, the parking assistance apparatus 1 can execute parking assistance for passengers to get in and out more easily.

The parking assistance apparatus 1 includes the memory 30 in the above embodiment, but a storage apparatus such as a hard disk drive may be used. The memory 30 includes volatile memory and non-volatile memory but may instead include only one of these (for example, volatile memory).

The invention claimed is:

1. A parking assistance apparatus comprising:
    a processor configured to extract a parking space from a surrounding image of a vehicle and to generate an image including a target parking position in overlap with the parking space, the surrounding image being captured by an imaging apparatus provided in the vehicle; and
    a memory configured to store history information associating a past parking position of the vehicle with the parking space,
    wherein the processor adjusts a position of the target parking position in the image based on a difference between a deviation rate of the target parking position and a deviation rate of the past parking position.

2. The parking assistance apparatus of claim 1, wherein the memory stores a plurality of pieces of the history information divided into predetermined categories.

3. The parking assistance apparatus of claim 2, wherein the predetermined categories are based on positions of the vehicle.

4. The parking assistance apparatus of claim 2, wherein the predetermined categories are based on types of parking.

5. The parking assistance apparatus of claim 1, wherein the processor further adjusts the position of the target parking position in the image on the basis of information related to a passenger of the vehicle.

6. The parking assistance apparatus of claim 5, wherein the information related to the passenger of the vehicle is a seating position of the passenger of the vehicle.

7. The parking assistance apparatus of claim 1, wherein each deviation rate is calculated by an equation R=DR/DL, where R is the deviation rate, DR is a distance between the vehicle and a right boundary of the parking space with reference to a forward direction of the vehicle and DL is a distance between the vehicle and a left boundary of the parking space with reference to the forward direction of the vehicle.

8. An on-vehicle camera comprising a parking assistance apparatus,
    wherein the parking assistance apparatus comprises:
        a processor configured to extract a parking space from a surrounding image of a vehicle and to generate an image including a target parking position in overlap with the parking space, the surrounding image being captured by an imaging apparatus provided in the vehicle; and
        a memory configured to store history information associating a past parking position of the vehicle with the parking space; and
    wherein the processor adjusts a position of the target parking position in the image based on a difference between a deviation rate of the target parking position and a deviation rate of the past parking position.

9. The on-vehicle camera of claim 8, wherein each deviation rate is calculated by an equation R=DR/DL, where R is the deviation rate, DR is a distance between the vehicle and a right boundary of the parking space with reference to a forward direction of the vehicle and DL is a distance between the vehicle and a left boundary of the parking space with reference to the forward direction of the vehicle.

10. A vehicle comprising a parking assistance apparatus, wherein the parking assistance apparatus comprises:
    a processor configured to extract a parking space from a surrounding image of the vehicle and to generate an image including a target parking position in overlap with the parking space, the surrounding image being captured by an imaging apparatus provided in the vehicle; and
    a memory configured to store history information associating a past parking position of the vehicle with the parking space; and
    wherein the processor adjusts a position of the target parking position in the image based on a difference between a deviation rate of the target parking position and a deviation rate of the past parking position.

11. The vehicle of claim 10, wherein each deviation rate is calculated by an equation R=DR/DL, where R is the deviation rate, DR is a distance between the vehicle and a right boundary of the parking space with reference to a forward direction of the vehicle and DL is a distance between the vehicle and a left boundary of the parking space with reference to the forward direction of the vehicle.

12. A parking assistance method executed by a parking assistance apparatus comprising a processor and a memory, the parking assistance method comprising:
    extracting, using the processor, a parking space from a surrounding image of a vehicle, the surrounding image being captured by an imaging apparatus provided in the vehicle;

generating, using the processor, an image including a target parking position in overlap with the parking space;

storing, using the memory, history information associating a past parking position of the vehicle with the parking space; and adjusting, using the processor, a position of the target parking position in the image based on a difference between a deviation rate of the target parking position and a deviation rate of the past parking position.

13. The parking assistance method of claim 12, wherein each deviation rate is calculated by an equation R=DR/DL, where R is the deviation rate, DR is a distance between the vehicle and a right boundary of the parking space with reference to a forward direction of the vehicle and DL is a distance between the vehicle and a left boundary of the parking space with reference to the forward direction of the vehicle.

* * * * *